United States Patent
Nehrig et al.

(10) Patent No.: US 8,941,473 B2
(45) Date of Patent: Jan. 27, 2015

(54) ELECTRONIC DEVICE AND METHOD FOR RFID

(75) Inventors: Oliver Nehrig, Kirchdorf (DE); Dirk Preikszat, Freising (DE)

(73) Assignee: Texas Instruments Deutschland GmbH, Freising (DE)

(*) Notice: Subject to any disclaimer, the term of this patent is extended or adjusted under 35 U.S.C. 154(b) by 516 days.

(21) Appl. No.: 13/291,821

(22) Filed: Nov. 8, 2011

(65) Prior Publication Data

US 2012/0119884 A1 May 17, 2012

(30) Foreign Application Priority Data

Nov. 8, 2010 (DE) .......................... 10 2010 050 486

(51) Int. Cl.
- *H04Q 5/22* (2006.01)
- *H03K 5/22* (2006.01)
- *G06K 19/077* (2006.01)

(52) U.S. Cl.
CPC .... *G06K 19/07773* (2013.01); *G06K 19/07766* (2013.01)
USPC .......... 340/10.4; 327/63; 455/13.3; 343/776; 343/777

(58) Field of Classification Search
CPC ........... G06K 19/07773; H04B 5/0062; H04B 7/0817; H04B 7/082
See application file for complete search history.

(56) References Cited

U.S. PATENT DOCUMENTS

| | | | |
|---|---|---|---|
| 5,436,582 A * | 7/1995 | Ikeda | 327/65 |
| 6,150,986 A | 11/2000 | Sandberg et al. | |
| 2007/0247286 A1* | 10/2007 | Drago et al. | 340/10.4 |
| 2008/0259665 A1* | 10/2008 | Brederlow et al. | 363/127 |
| 2010/0033254 A1 | 2/2010 | Cao | |

FOREIGN PATENT DOCUMENTS

| | | |
|---|---|---|
| CN | 201429673 | 3/2010 |
| DE | 3825661 | 12/1989 |

OTHER PUBLICATIONS http://electrofriends.com/source-codes/software-programs/c/simple-programs/to-find-the-biggest-and-smallest-of-three-numbers/ (Published on Dec. 3, 2008).*
DE Search Report mailed May 3, 2012.
DE Search Report mailed Jul. 29, 2011.

* cited by examiner

*Primary Examiner* — Steven Lim
*Assistant Examiner* — Omeed Alizada
(74) *Attorney, Agent, or Firm* — William B. Kempler; Frederick J. Telecky, Jr.

(57) ABSTRACT

An electronic device comprising a first node to be coupled to a first antenna, a second node coupled to a second antenna, a third node to be coupled to a third antenna, a first comparator coupled with a first input to the first node and with a second input to a second node, a second comparator coupled with a first input to the first node and with a second input to the third node, a third comparator coupled with a first input to the second node and with a second input to the third node. Each of the first, the second and the third comparators are configured to compare a first current and a second current at the first input and the second input.

5 Claims, 4 Drawing Sheets

ELECTRONIC DEVICE AND METHOD FOR RFID

CROSS-REFERENCE TO RELATED APPLICATIONS

This patent application claims priority from German Patent Application No. 10 2010 050 486.6, filed Nov. 8, 2010, which is incorporated herein by reference in its entirety.

FIELD OF THE INVENTION

The invention relates to an electronic device and a method for RFID, and more specifically to an electronic device and a method for selecting a channel of a 3D antenna.

BACKGROUND OF THE INVENTION

One type of RFID (Radio Frequency Identification) devices are half-duplex RFID transponders with an integrated three-dimensional front-end circuit. These RFID transponder comprise three LC resonant circuits arranged in a three-dimensional configuration and each LC resonant circuit is coupled to a storage capacitor which is charged during a capacitor charging phase by energy comprised in an RF signal which is received by the three LC resonant circuits.

RFID systems including RFID transponders and an interrogator unit are used for example in portable identification devices such as passive entry and immobilizer keys for vehicles. In this case, the interrogator unit is usually placed in the vehicle and the transponder is carried by the driver in form of a tag or a chip card. Typically, these RFID systems operate at a frequency in a low frequency (LF) range around 125 kilohertz or 134 kilohertz.

Active transponders are battery powered, whereas passive transponders have no autonomous power supply. Instead, they use RF energy received with an LC resonant circuit from the interrogator unit during an interrogation interval by rectifying the received RF signal and charging a storage capacitor with the rectified signal. Combined systems are known where a battery is provided as a backup solution, in case that the charged power is insufficient.

Passive transponders are usually realized as half-duplex (HDX) transponders. A HDX transponder receives in a first time an interrogation RF signal. The end of the interrogation interval is detected by an end-of-burst (EOB) detector. The interrogation interval is followed by a response interval during which the transponder is expected to send some response, e.g. an ID code or some other data. Energy for operating the transponder when sending the response during the response interval is supplied by the storage capacitor.

Transponders with only one antenna are sensitive to orientation. Therefore, advanced transponders are provided with three antennas in the form of three LC resonant circuits which are arranged in a three-dimensional configuration. The three antenna circuits have antenna structures that are physically oriented at mutually 90 degrees. With such a transponder, signals from a transceiver/interrogator placed for example in a vehicle are detected independently of orientation in space of the transponder.

While it is an advantageous to have three LC resonant circuits, this means that three receiver channels are needed. On the other hand, it is important that power consumption of the transponder during charging the storage capacitor must be as low as possible.

Each of the three antennas is directed in a different direction in order to provide optimum reception regardless of the orientation and location of the device. Since a radio frequency signal received with the antenna may have varying field strength dependent on the specific orientation, it is necessary to determine the channel or in other words the antenna having the highest field strength of the received signal. This is usually performed by a channel selector.

The RFID system with three antennas in each spatial direction should ensure proper functionality even if the RFID device is displaced or rotated with respect to the reader. In order to ensure that the RFID tag sends over the antenna with the best coupling to the reader, the strongest channel during downlink is to be detected.

SUMMARY OF THE INVENTION

It is a general object of the invention to provide an electronic device and a method for selecting a channel or more specifically selecting an antenna having the best coupling to the reader having minimum power consumption and complexity of the circuit.

According to an aspect of the invention, there is an electronic device that comprises of a first node to be coupled to a first antenna, a second node to be coupled to a second antenna, and a third node to be coupled to a third antenna. There is a first comparator coupled with the first input to the first node and with the second input to the second node. A second comparator is coupled with the first input to the first node and with the second input to the third node. There is a third comparator coupled with the first input to the second node and with the second input to the third node. This arrangement makes it possible to compare the three induced antenna currents pairwise. Three comparisons are sufficient in order to determine the strongest channel. Furthermore the result of the comparisons can be subject to further digital processing.

Each of the comparators can have the same configuration. Accordingly, each comparator may be configured to compare two currents. The currents are the currents at the first and the second input of the comparator. This is advantageous especially compared with comparators configured to only compare voltages. The current comparators have a larger dynamic range than the voltage comparators. The current comparators even operate properly in the near field where the field strength is high.

Each of the first, the second and the third comparator may comprise a current mirror and a first and a second transistor receiving a bias voltage at their control gates. The first transistor may be coupled with one side of a channel to one current path of the current mirror and the second transistor may be coupled with one side of the channel to another current path of the current mirror. The other side of the channel of the first transistor may then be used as the first input of the comparator. Accordingly, the other side of the channel of the first transistor may be coupled to the first node, the second node or the third node dependent on the respective comparator. The other side of the channel of the second transistor may then be used as a second input of the comparator. Accordingly, the other side of the second channel of the second transistor may then be coupled to the first node, the second node or the third node dependent on whether it is related to the first comparator, the second comparator or the third comparator. A second side of the channel of the second transistor may then be used as the output node of the comparator.

The first, second and third nodes may be the three RF inputs of the RFID device. The first transistor and the second transistor may be MOS transistors. In this situation, the first and second transistors may operate as diodes (MOS diodes). The two MOS diodes are then connected to the first node and the second node, respectively (first comparator), the second and the third node, respectively (third comparator) or to the first node and the second node, respectively (second comparator). The voltage level at the first node, second node and third node will alternate and vary in accordance with the received field strength of the respective first, second and third antenna coupled to the first, second and third nodes. The low half-wave of an oscillating received RF signal may then pull the voltage at the first, second and third node to a certain value around one threshold voltage level above the low-peak radio frequency level. In the first and the second MOS transistors, which are connected to the first, second and third nodes, a current may flow depending on the RF level. The current mirror may then be coupled to the first and second transistors. This configuration provides a current compare of the currents through the channels of the first transistor and the second transistor.

The low-peak currents at the output (other side of the channel of the second transistor) may then be sampled on a capacitor. An individual capacitance may be coupled to the output of the first comparator, the output of the second comparator and/or the output of the third comparator respectively. The respective output signal (voltage level at a capacitance) may then become high or low depending on the amount of current flowing to the input transistor. The radio frequency level of the signal received with each of the antennas is proportional to the field strength. Therefore, the comparison result indicates the field strength of the received signals. The three comparators coupled to compare the first channel, the second channel and the third channel may then provide the required information for selecting the channel with the highest field strength.

There may be a bias voltage generation stage for generating the bias voltage for the first and second transistors of each comparator. The bias voltage generation stage may comprise a current source, a diode coupled transistor and a capacitor, the diode coupled transistor and the current source are coupled in series, a first side of the diode coupled transistor may then be coupled to the current source and a second side to either the first node, the second node or the third node (i.e. one side of the first, second and third antenna, if the antennas are connected to the electronic device). One side of the capacitor may be coupled to the node between the current source and the diode coupled transistor. The first side of the diode coupled transistor may further be coupled to the control gates of the first and the second transistor of the first comparator, the second comparator or the third comparator, respectively. This is very efficient biasing scheme with minimum power consumption and only very few components.

The invention also provides a method of operating an RFID transponder comprising a first node to be coupled to a first antenna, a second node to be coupled to a second antenna, a third node to be coupled to a third antenna. A current into the first node may then be compared with a current into the second node. The current into the first node may further be compared with a current into the third node and the current into the second node may be compared with the current into the third node. One of the three antennas, i.e. the signal from the respective antenna may then be selected for the further signal processing as the best received signal based on the three comparison results.

The steps of comparing may comprise a plurality of oscillation periods of a radio frequency signal received at the first antenna, second antenna and/or third antenna. Charge may be integrated on a capacitor during these oscillation periods. The charge may then relate to the currents which are compared. This provides a more reliable result of the comparison. However, it is advantageous to compare the currents instead of the voltages.

BRIEF DESCRIPTION OF DRAWINGS

Further aspects of the invention will appear from the appending claims and from the following detailed description given with reference to the appending drawings.

DETAILED DESCRIPTION OF EXAMPLE EMBODIMENTS

Figure 1:
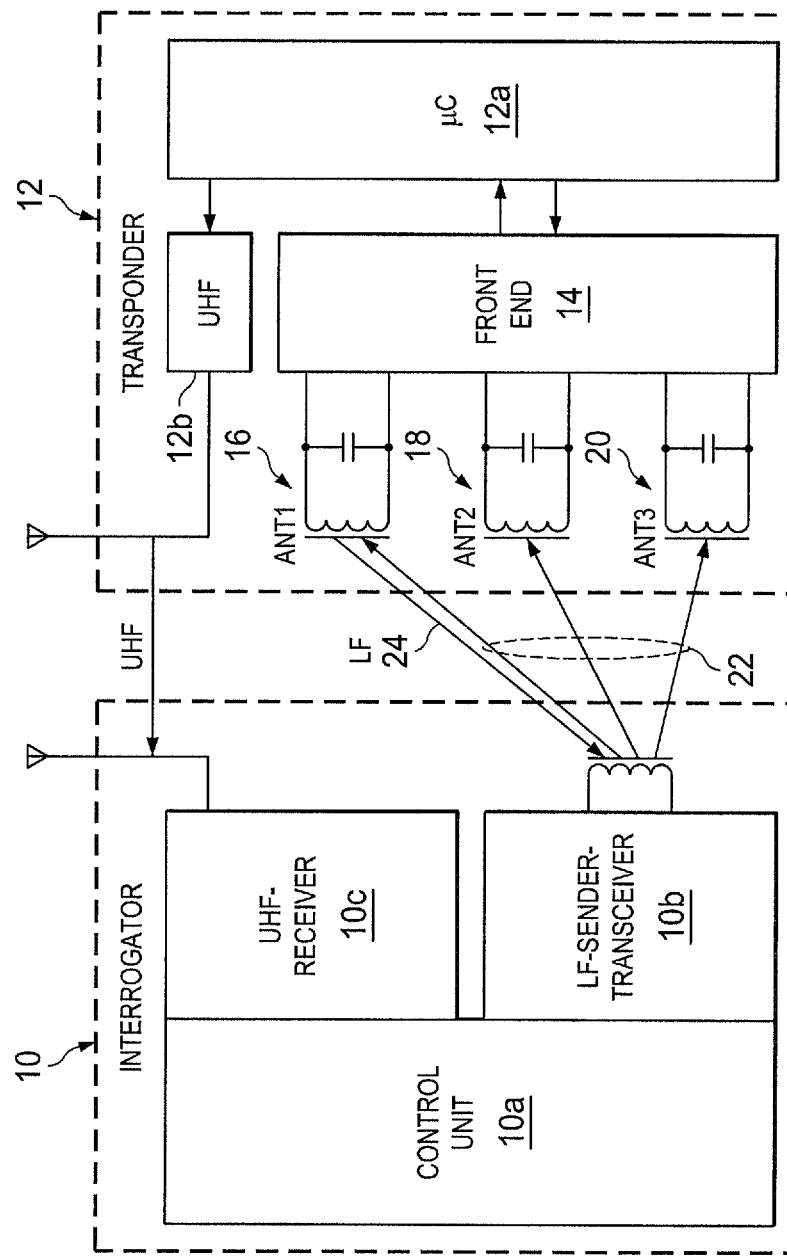
FIG. 1 shows a simplified circuit diagram of an RFID system to which the invention relates.

FIG. 1 shows an RFID system comprising an interrogator 10 which in the case of a passive entry system may be located in a vehicle. The interrogator comprises for example a control unit 10a, an LF transceiver 10b and a UHF receiver 10c. The RFID system further comprises an identification device or key or transponder 12 comprising for example a microcontroller or control logic 12a and may additionally have a UHF transmitter 12b for sending a UHF signal, and a front-end circuit 14 according to the invention connected to three LC resonant circuits 16, 18 and 20, which are arranged in a three-dimensional configuration. Each LC resonant circuit includes a coil (antenna), so there are three antennas ANT1, ANT2 and ANT3. Arrows 22 indicate that the LF transceiver 10b will send an interrogation signal to all three LC resonant circuits during an interrogation interval. The interrogation interval is at the same time a capacitor charging phase, as at least one storage capacitor comprised in the transponder will be charged to supply the transponder with energy during the response interval. According to the orientation in space of transponder 12 in relation to interrogator unit 10, one LC resonant circuit will receive the interrogation signal best and the associated receiver channel will be selected. Only the LC resonant circuit which is associated to the selected receiver channel will send a response signal. In FIG. 1 this is LC resonant circuit 16 and the response signal is indicated by an arrow 24. Although FIG. 1 shows both directions for signal transmission, it is to be understood that in a half-duplex transponder receiving and transmitting are separated in time, transponder 12 first receives an interrogator signal 22 and afterwards sends a response 24.

Figure 2:
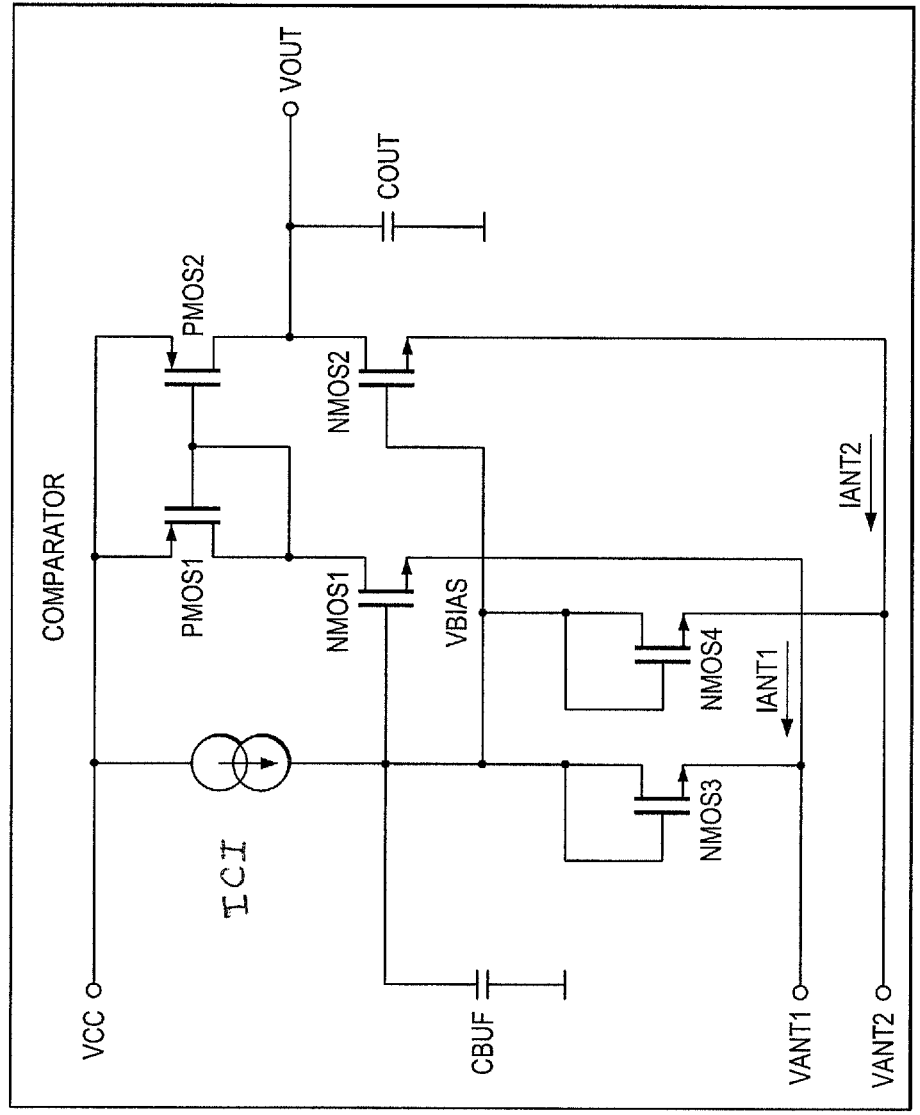
FIG. 2 shows a simplified circuit diagram of a comparator according to the invention.

FIG. 2 shows a simplified circuit diagram of a comparator according to the invention. The comparator comprises a current mirror consisting of transistors PMOS1 and PMOS2. There is a first transistor NMOS1 and second transistor NMOS2. Two diode-coupled transistors NMOS3 and NMOS4 are coupled with drain and gates to the gates of NMOS transistors NMOS1 and NMOS2 and with their sources to the nodes VANT1 and VANT2. There is a first node VANT1 and a second node VANT2. The first node VANT1 is configured to be coupled to a first antenna (not shown and usually not integral part of the electronic device). The second node VANT2 can be coupled to a second antenna (also not shown and usually not part of the electronic device). There is a buffer capacitor CBUF and another capacitor COUT for buffering the output voltage VOUT which is generated at the node between PMOS2 and NMOS2. The current source ICI in combination with diode-coupled transistors NMOS3 and NMOS4 as well as buffer capacitor CBUF serves to produce a bias voltage at node VBIAS which is coupled to the control gates of the first transistor NMOS1 and the second transistor NMOS2. Transistor PMOS1 is coupled with the source to the supply voltage VCC. The gate of transistor PMOS1 is coupled to the gate of transistor PMOS2. Furthermore, the drain of transistor PMOS1 is coupled to the gates of transistors PMOS1 and PMOS2. Transistor PMOS2 is coupled with the source to the supply voltage VCC. The drain of transistor PMOS1 is coupled to the drain of the first transistor NMOS1. The drain of transistor PMOS2 is coupled to the drain of the second transistor NMOS2. The sources of transistor NMOS1 and NMOS2 are coupled to nodes VANT1 and VANT2, respectively. The output node VOUT is the node between the drain of PMOS2 and the drain of NMOS2. The current generated by current source ICI is supplied to the diode-coupled transistors NMOS3 and NMOS4. Dependent on the voltage at the first node VANT1 and the second node VANT2, a bias voltage VBIAS is produced on the control gates of NMOS1 and NMOS2. The currents flowing from the first transistor NMOS1 to node VANT1 and from the source of the second transistor NMOS2 to the second node VANT2 are currents IANT1 and IANT2. IANT1 is mirrored and directly fed through transistor NMOS2 as current IANT2. The output VOUT becomes logic high if IANT1 is greater than IANT2 and zero if IANT1 is lower than IANT2.

TABLE 1

| Current ratio | VOUT |
|---|---|
| IANT1 > IANT2 | 1 |
| IANT1 < IANT2 | 0 |

In order to handle any possible phase shift between the two antennas (ANT1 and ANT2 not shown in this figure), the output voltage has to be sampled on the capacitor COUT. This means that several antenna amplitudes have to be measured according to the antenna voltage (current) difference. In increasing the number of amplitudes, the precision of the circuit increases. The generation of VBIAS is performed with MOS diodes (NMOS3, NMOS4) and the sum of all antennas. This results in a more constant current in the comparator shown in FIG. 1. The current is then more or less independent of the absolute field strength value.

Figure 3:
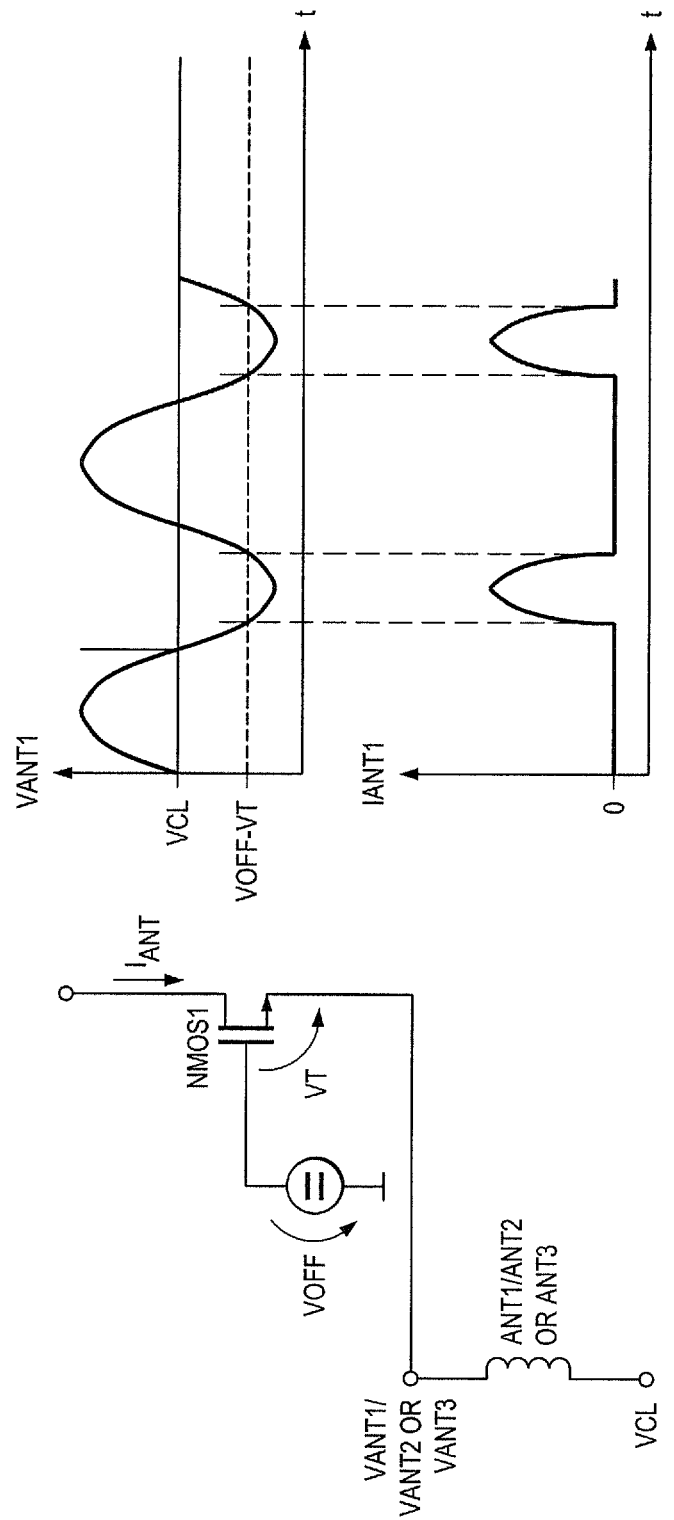
FIG. 3 shows a simplified circuit diagram illustrating the operation of the comparator according to the invention.

FIG. 3 illustrates the operation of the comparator according to the invention. A 134 kHz system like the one shown in FIG. 1, for which the channel selector according to aspects of the invention is designed, receives its power over a bulk diode, which charges a buffer capacitor. This means during charge up and downlink, the antenna input amplitude falls down below ground. An End-Of-Burst detector detects, whether or not the antenna voltage drops below ground. The fieldstrength measurement is performed as illustrate in FIG. 3. If the antenna voltage VANT1 (or VANT2 or VANT3) amplitude falls down below VOFF−VT (VT is the threshold voltage of NMOS1 or NMOS2), a current flows through the transistor NMOS1. Each (each other matching) transistor at each antenna input VANT1 (VANT2, VANT3) shows different current values according to the respective field strength. The currents are then compared with each other as the current mirror supplies the same current to both paths of the current comparator. The voltage VCL is rather constant.

Because the value of the fieldstrength is not of interest, only the current difference is tracked. No absolute fieldstrength measurement is done with this circuit.

Figure 4:
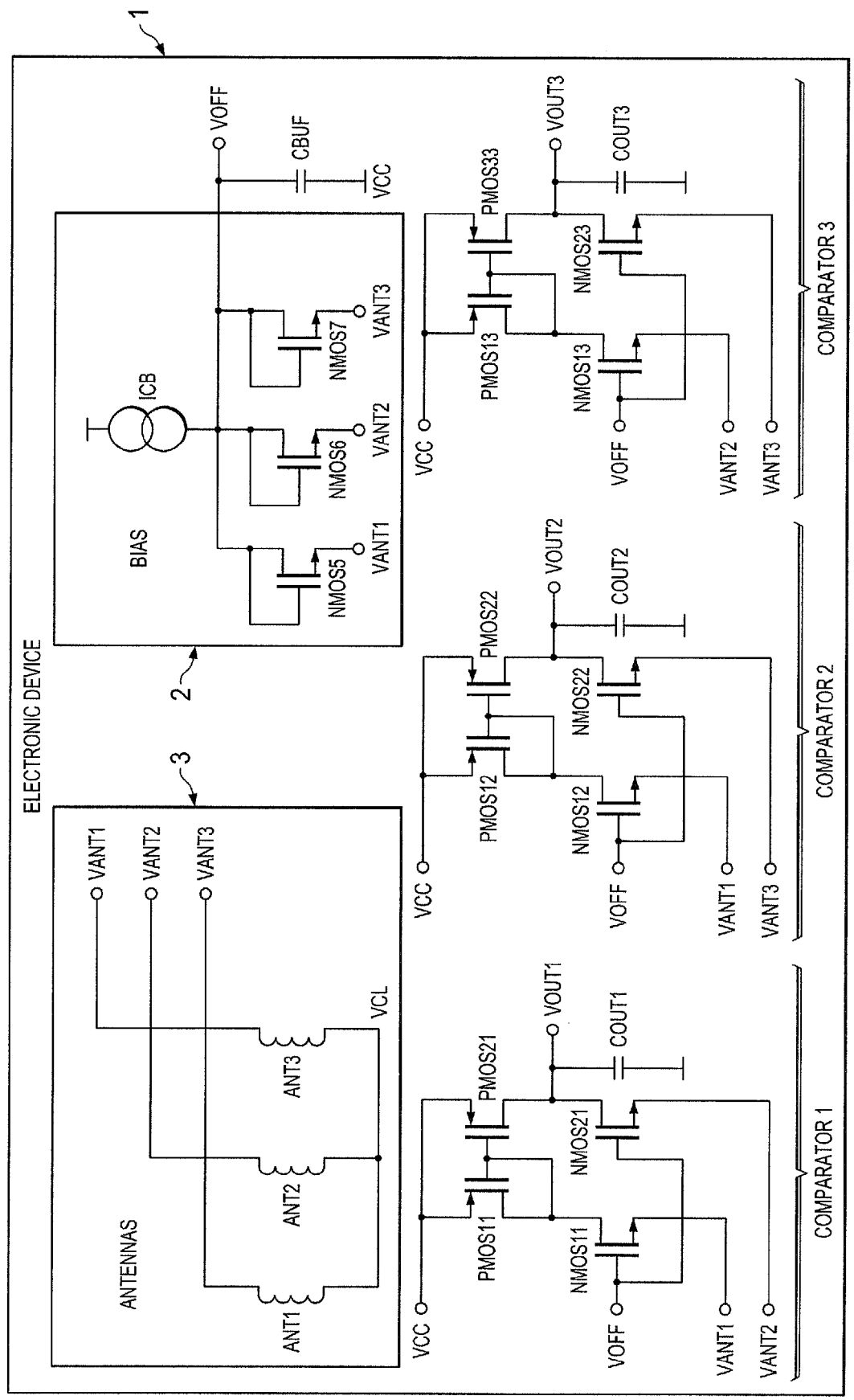
FIG. 4 shows a simplified circuit diagram of an electronic device using the invention.

FIG. 4 shows an electronic device 1 including comparator 1, comparator 2 and comparator 3 according to aspects of the invention. The comparators 1, 2 and 3 shown in FIG. 4 are similar to the one in FIG. 2. The idea is now that these comparators 1, 2 and 3 are coupled to the first node VANT1, the second node VANT2 and the third node VANT3, respectively, according to aspects of the invention. Comparator 1 may then be coupled to the first node VANT1 and the second node VANT2. The comparator 2 may be coupled to the first node VANT1 and to the third node VANT3. The comparator 3 may be coupled to the second node VANT2 and the third node VANT3. Nodes VANT1, VANT2 and VANT3 are the input nodes of the comparator stages.

The antennas (inductive coils) ANT1, ANT2, ANT3 are usually not integrated in the electronic device 1. The antennas are coupled with one side to a common voltage VCL. This means that they all refer to the same voltage level, which changes rather low with respect to the HF signal received with the antenna. The antennas ANT1, ANT2, ANT3 are shown separately in the upper left corner of FIG. 4.

The output nodes are VOUT1, VOUT2 and VOUT3. Each stage compares two antenna signals and provides a corresponding output indicating whether the current at the first input node or the second input node (VANT1, VANT2 or VANT3) is greater. The result can then be further processed in a digital stage in order to elect only the signal from the antenna having the highest field strength and the best signal.

The biasing of the three comparators COMP1, COMP2 and COMP3 can be performed by a common bias stage BIAS2 which is shown in the upper middle of FIG. 4. The bias stage is implemented in accordance with aspects of the invention. The bias voltage VOFF is optimized and one threshold voltage above the voltage at the antenna node VANT1, VANT2 and VANT3. The bias voltage VOFF is therefore just large enough to open the first and second transistors (NMOS11 to NMOS33) of each comparator. The NMOS transistors NMOS5, NMOS6 and NMOS7 are diode coupled, i.e. their gates are connected to their drains. A current source ICB is coupled between supply voltage and the drains of transistors NMOS5, NMOS6 and NMOS7. The source of transistor NMOS5 is coupled to first node VANT1, i.e. the first antenna ANT1. The source of transistor NMOS6 is coupled to the second node VANT2, i.e. the second antenna ANT2. The source of transistor NMOS7 is coupled to the third node VANT3, i.e. the third antenna ANT3. As transistors NMOS5, NMOS6 and NMOS7 are diode coupled, the bias voltage VOFF is about one (NMOS in this case) threshold level greater than the level at the respective node. This produces the minimum required bias voltage for transistors NMOS11, NMOS21, NMOS12, NMOS22, NMOS13 and NMOS23 which all receive the bias voltage VOFF produced by transistors NMOS5, NMOS6, NMOS7. Therefore bias stage BIAS 2 generates the appropriate minimum bias voltage for the three comparators. In a different embodiment, each of the comparators may have a separate bias stage as the one shown in FIG. 4 with only two diode coupled transistors.

Although the invention has been described in detail, it should be understood that various changes, substitutions and alterations can be made thereto without departing from the spirit and scope of the invention as defined by the appended claims.

The invention claimed is:
1. An electronic device comprising:
a first node to be coupled to a first antenna;
a second node to be coupled to a second antenna;
a third node to be coupled to a third antenna;

a first comparator coupled with a first input to the first node and with a second input to a second node;

a second comparator coupled with a first input to the first node and with a second input to the third node; and a third comparator coupled with a first input to the second node and with a second input to the third node, wherein each of the first, the second and the third comparator is configured to compare a first current and a second current at the first input and the second input, wherein each of the first, second and third comparators comprises a current mirror, a first and a second transistor receiving a bias voltage at their control gate, the first transistor is coupled with one side of a channel to one current path of the current mirror and the second transistor is coupled with one side of the channel to another current path of the current mirror, the other side of the channel of the first transistor is the first input of the comparator, the other side of the channel of the second transistor is the second input of the comparator and the second side of the channel of the second transistor is the output node of the comparator.

2. The electronic device according to claim 1, further comprising a bias voltage generation stage for generating the bias voltage for the first and second transistor, wherein the bias voltage generation stage comprises a current source, a diode coupled transistor and a capacitor, the diode coupled transistor and the current source are coupled in series, a first side of the diode coupled transistor is coupled to the current source and a second side to one of the first node, the second node or the third node, one side of the capacitor is coupled to the node between the current source and the diode coupled transistor, and the first side of the diode coupled transistor is further coupled to the control gates of the first and the second transistor of one of the first comparator, the second comparator or the third comparator, respectively.

3. The electronic device according to claim 1, wherein an individual capacitance is coupled to the output of the first, the second and the third comparator.

4. The electronic device according to claim 2, wherein an individual capacitance is coupled to the output of the first, the second and the third comparator.

5. A method of operating an RFID transponder comprising a first node to be coupled to a first antenna, a second node to be coupled to a second antenna, a third node to be coupled to a third antenna, the method comprising:

comparing a current into the first node with a current into the second node;

comparing the current into the first node with a current into the third node;

comparing the current into the second node with the current into the third node, wherein the steps of comparing comprise comparing; a first current and a second current at a first input and a second input, wherein each of first, second and third comparators comprises a current mirror;

passing a first current from one side of the current mirror through one side of a channel on the first transistor;

passing a second current from another side of the current mirror through one side of a channel of a second transistor;

biasing control gates of the first and second transistors with a bias voltage;

coupling one input to the comparator to a second side of the channel for the first transistor;

coupling another input to the comparator to a second side of the channel for the second transistor, wherein an output of the comparator is at the first side of the channel of the second transistor; and selecting the antenna based on the three comparison results.

* * * * *